A. R. SCHMIDT.
METHOD OF FORMING KNOCK-OUT PLATES.
APPLICATION FILED SEPT. 30, 1914.
1,128,532. Patented Feb. 16, 1915.
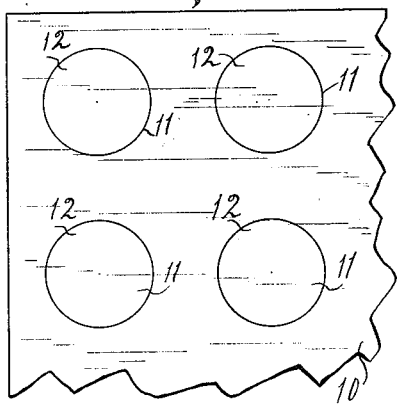
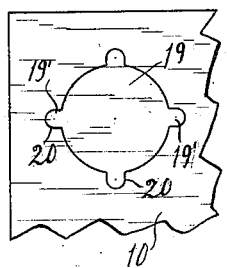
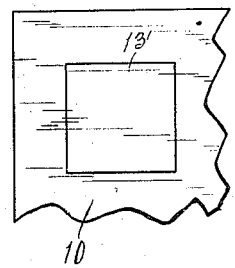
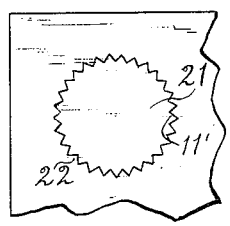
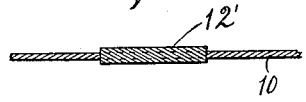
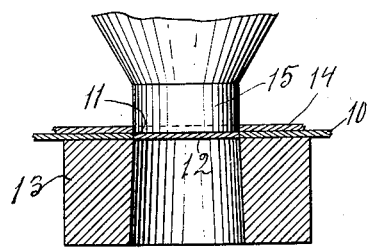
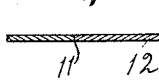
WITNESSES
C. F. Miller.
Emily Schowalter
INVENTOR
Albert R. Schmidt,
By Monsell, Keeney & French
ATTORNEYS

UNITED STATES PATENT OFFICE.

ALBERT R. SCHMIDT, OF MILWAUKEE, WISCONSIN.

METHOD OF FORMING KNOCK-OUT PLATES.

1,128,532.  Specification of Letters Patent.  Patented Feb. 16, 1915.

Application filed September 30, 1914. Serial No. 864,192.

*To all whom it may concern:*

Be it known that I, ALBERT R. SCHMIDT, a citizen of the United States, and resident of Milwaukee, in the county of Milwaukee and State of Wisconsin, have invented new and useful Improvements in Methods of Forming Knock-Out Plates, of which the following is a description, reference being had to the accompanying drawings, which are a part of this specification.

This invention relates to improvements in method of forming knock-out plates.

In forming outlet boxes for interior conduits it is desirable to provide the walls of the boxes with suitable openings to receive the ends of the conduits which are secured to the walls in any manner desired. For commercial purposes it is desirable to have the holes made in the boxes when furnished to the trade, but as the number of conduits for a box vary it is not known how many openings will be required and it is not desirable to have more openings in the box than will be actually used. In order to overcome this difficulty the boxes now furnished to the trade are formed of sheet metal and have a number of openings partly formed in the walls so that the blanks closing the openings it is desired to use, may be easily punched outwardly to complete the openings. In boxes of this type the walls thereof are often injured in punching out the blanks due to the fact that the openings are not initially sufficiently cut. In other types of boxes the openings are completely formed and the blanks are replaced in the respective openings and are frictionally held therein, and in use the blanks of the openings to be used, are knocked out in the same manner before described. This last mentioned type while possessing many desirable features is also objectionable on account of the difficulty in preventing the blanks from accidentally dropping out of the openings.

A further objectionable feature resides in the expense in replacing the blanks in the openings in the manufacture of said boxes.

It is one of the objects of the present invention to overcome the before mentioned objectionable features and provide an improved method of forming knock-out plates adapted for use in making outlet boxes and also for other uses.

A further object of the invention is to provide a method of forming knock-out plates in which the blanks used for filling the conduit openings are formed from plates other than the plates to be used and are punched and inserted in the openings of the knock-out plates at the same time the openings of the knock-out plates are formed and thereby saving cost of rehandling the blanks.

A further object of the invention is to provide an improved method of forming knock-out plates in which the blanks may be firmly wedged in the openings of the knock-out plates by wedging blanks interposed between the knock-out plates and the aperture closing blanks.

A further object of the invention is to provide an improved method of forming knock-out plates in which the openings and blanks are so formed as to increase the area of the engagement of the contacting edges of the blanks and the plates.

A further object of the invention is to provide an improved method of forming knock-out plates in which the plates thus formed are strong and durable and are well adapted for the purpose described.

With the above and other objects in view the invention relates to the improved method for forming knock-out plates and its parts and combinations as set forth in the claims and all equivalents thereof.

In the accompanying drawing in which the same reference characters indicate the same parts in all of the views: Figure 1 is a side view of a portion of a plate provided with the improved knock-out portions; Fig. 2 is a sectional view thereof; Fig. 3 is a vertical sectional view of a punch and a die to illustrate the improved method of forming the knock-out plates; Fig. 4 is a side view of a plate having a modified form of knock blank; Fig. 5 is a similar view of another modified form; Fig. 6 is a similar view of still another modified form; Fig. 7 is a transverse sectional view of a fragment of a knock-out plate showing a wedge blank interposed between the plate and the filling blank; and Fig. 8 is a transverse sectional view of a fragment of a plate having a modified form of filling blank.

Referring to the drawing the numeral 10 indicates a fragment of the improved knock-out plate provided with the circular openings 11, which are filled by the blanks 12. In forming the improved plates the knock-out plate is placed on a die 13 with a waste plate 14 resting on top thereof. The punch 15 positioned above the two plates is so adjusted that upon its downward punching stroke it will just pass through the upper or blank plate and punch the blank 12 from said upper plate and this blank will in turn serve as the punch portion in punching out the waste disk 16 from the plate below, and in punching out said disk the blank will be wedged firmly in the opening 11 from which said waste disk 16 was punched. As the punch proper does not pass through the openings 11 said opening will be slightly smaller in diameter than the diameter of blank so that said blank will be firmly wedged in said openings.

If desired the waste plate may be of thicker metal than the knock-out plate and in such cases waste material, such as paper, (not shown) is placed between the two plates to space the plates apart the distance the blank 12' will project above the knock-out plate, before punching. Fig. 8 illustrates a plate formed in this manner.

In case it is desired to more firmly wedge the knock-out blanks in the openings of the knock-out plates, soft sheet metal such as brass or copper is interposed between the upper and the lower plates and in punching the plates and forcing the upper blank into the opening of the lower plate a disk 17 as shown in Fig. 7 will be cut from the sheet of interposed soft metal and will be forced through the lower opening and in passing therethrough an annular flange 18 will be drawn from the disk and interposed between the plate and the filling blank with the result that the filling blank will be more firmly wedged in the plate.

The flange 18 is formed by reason of the upper disk having its lower edge slightly rounded so that this rounded edge in engaging the soft metal of the intermediate plate will not make a sharp clean cut and in passing through the intermediate plate will form an annular flange around the intermediate blank which will extend around the disk of the upper plate and form a wedge flange between the upper disk and the lower plate.

In the modified form shown in Fig. 4 the opening and the filling blank 13' are of rectangular form while in Fig. 5 the blank 19 is provided with peripheral ears 19' which fit within the recesses 20 of the plate 10.

The modified form shown in Fig. 6 the peripheral edge of the filling blank 21 is of serrated form as indicated by the numeral 22 and fits within the opening 11' which is correspondingly serrated to provide greater contacting edge surface.

In use the filling blanks are knocked out as the openings are desired in the usual manner.

While the application described the plates and blanks as being formed of metal it is to be understood that other material may be used without departing from the spirit and scope of the invention.

From the foregoing description it will be seen that the invention contemplates the method of forming knock-out plates by simultaneously punching like openings in two plates and filling the openings of one of the plates by the blank cut from the other plate.

What I claim as my invention is:

1. The method of forming knock-out plates, which consists in punching a perforation in a plate of material and causing the blank punched from said plate to perforate and force out a blank from an adjacent plate, said first mentioned blank remaining in the perforation of the second plate and forming a removable closure for said perforation.

2. The method of forming knock-out plates, which consists in simultaneously perforating three plates of material and forcing the blank piece of punched metal from one of the perforations of one of the outer plates into the perforation of the other outer plate to form a removable closure therefor, the intermediate plate of metal being of softer material than the material of the outer plates, and also forcing the blank piece of material punched from the intermediate plate through the perforation of the last mentioned plate and forming a flange around said intermediate blank which is interposed between the transferred blank and the inner edge of the material surrounding the closed perforation.

In testimony whereof, I affix my signature, in presence of two witnesses.

ALBERT R. SCHMIDT.

Witnesses:
C. H. KEENEY,
EMILY SCHOWALTER.